A. HAMAR.
Preserving Wood.
No. 51,528.
Patented Dec. 12, 1865.
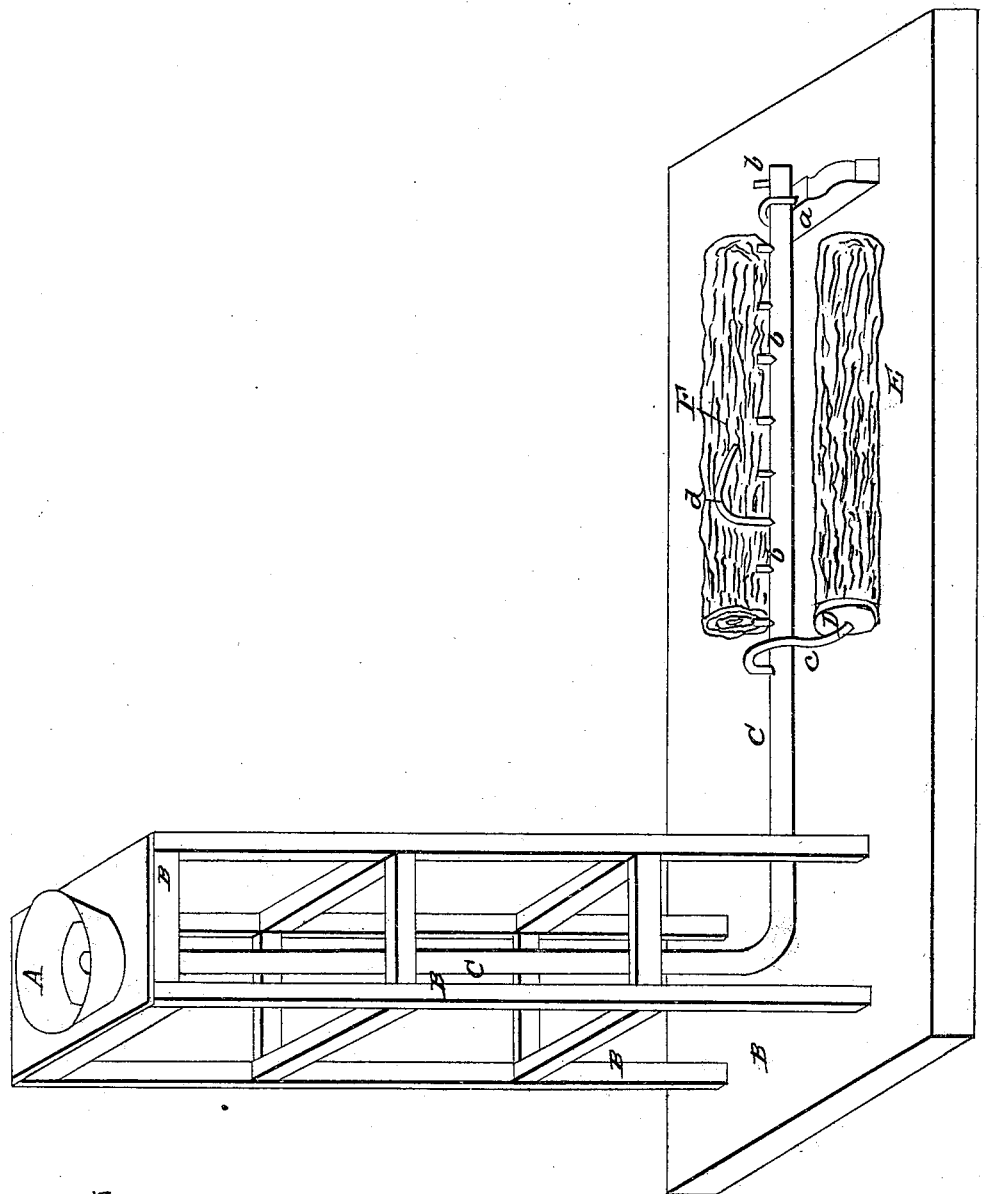

UNITED STATES PATENT OFFICE.

ALEXR. HAMAR, OF HUNGARY, EMPIRE OF AUSTRIA.

IMPROVEMENT IN PRESERVING TIMBER.

Specification forming part of Letters Patent No. 51,528, dated December 12, 1865.

*To all whom it may concern:*

Be it known that I, ALEXANDER HAMAR, a citizen of Hungary, in the Empire of Austria, now residing in the city, county, and State of New York, have invented a new and useful Method of Preserving Timber from Decay and from Destructive Insects; and I do hereby declare that the following is a full, clear, and exact description thereof, reference being had to the annexed drawings, making a part of this specification, in which a perspective view is given of the machinery proper to be used in one method of applying my invention.

Letters Patent of the United States were granted to me, bearing date the 4th day of July, 1865, for a method of preserving timber by injecting metallic solutions into the pores, and subsequent experiment has demonstrated that the same process may be advantageously applied to the preservation of timber when using mineral solutions; and my invention consists in the method described for injecting into the pores of wood a solution of salt, lime, or other mineral substance, for the purpose of preserving it from decay and from destructive insects.

My method of injecting mineral solutions into the pores of the timber to be preserved serves to divest these pores or cells of all those substances which, in the native condition of the timber, promote decay or furnish nourishment for injurious insects—such as starch, saccharine, albumen, fibrine, and lactive—and substitute instead thereof a material that resists decay and prevents the attack of injurious insects and renders the timber almost uninflammable.

To enable others skilled in the art to make and use my invention, I will proceed to describe its construction and operation.

A vat or tank, A, is mounted on a suitable supporting-frame, B, at an elevation of about twenty-six feet. A tube, C, attached to the vat, descends within the frame to near the ground, where it rests on the block $a$, and to the horizontal extension of the tube pipes $b$, of proper dimensions, are attached, each of which may be attached to a stick of timber to be treated with my process in one of the following methods.

A metal cap, D, may be fitted closely to one end of the stick E, and the pipe $c$, passing through the cap, will direct the solution into the pores of the wood from the vat A, or the pipe $d$ may be inserted into the center of the stick F with like effect.

The vat or tank is filled with a solution of muriate of soda, lime, or other mineral substance, the mineral being in the largest proportion that water will hold in solution, at about the temperature of 70° Fahrenheit, though it is manifest that a slight deviation in the strength of the solution will not change the character of my invention. The pressure of the weight of the solution, increased by the pressure of the atmosphere above it, exerts a pressure on the timber that will force the fluid from the tank into the pores of the timber and force from those pores all that they previously contained, and whenever the solution issues from the timber under pressure of the same strength as it is in the tank the process of impregnation is effected. The timber will then be divested of the matters previously held in its pores, and these will be filled with the mineral solution.

It is obvious that the timber thus treated may be brought to almost any color desired by simply coloring the solution.

What I claim as my invention, and desire to secure by Letters Patent, is—

Preserving timber from decay, insects, and other destructive agents by means of a solution prepared substantially as herein described, and applied in the manner herein set forth.

In testimony whereof I have hereunto subscribed my name.

A. HAMAR, JR.

Witnesses:
CHARLES NETTLETON,
A. NAUMANN.